UNITED STATES PATENT OFFICE.

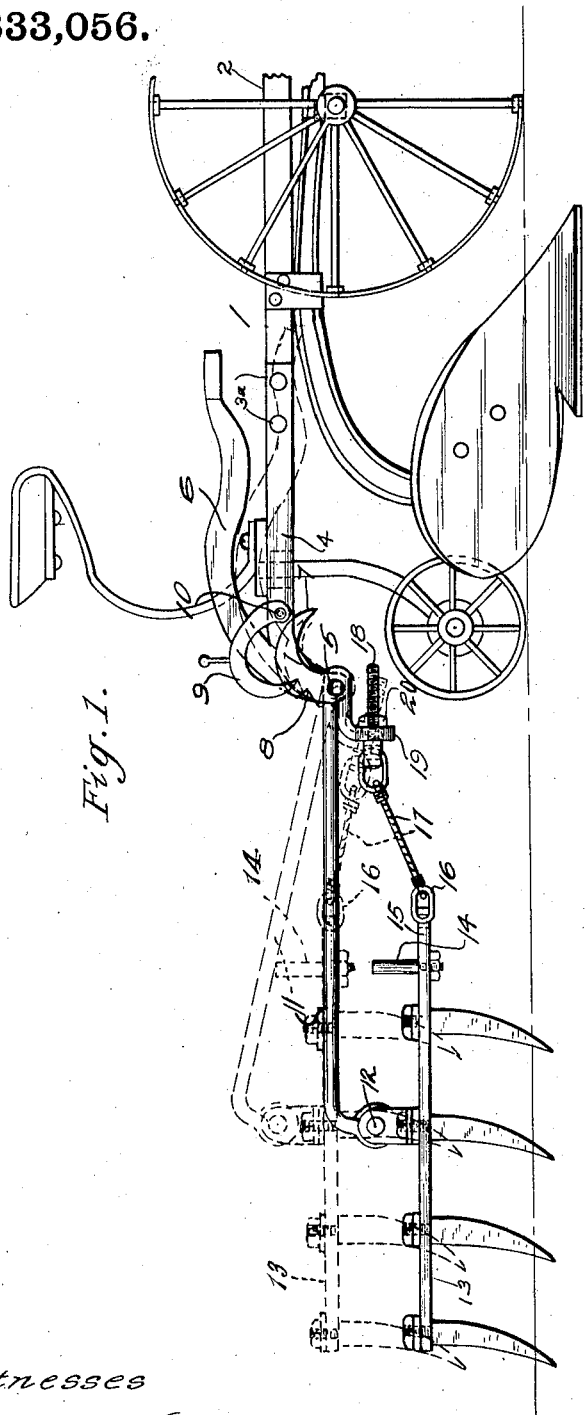

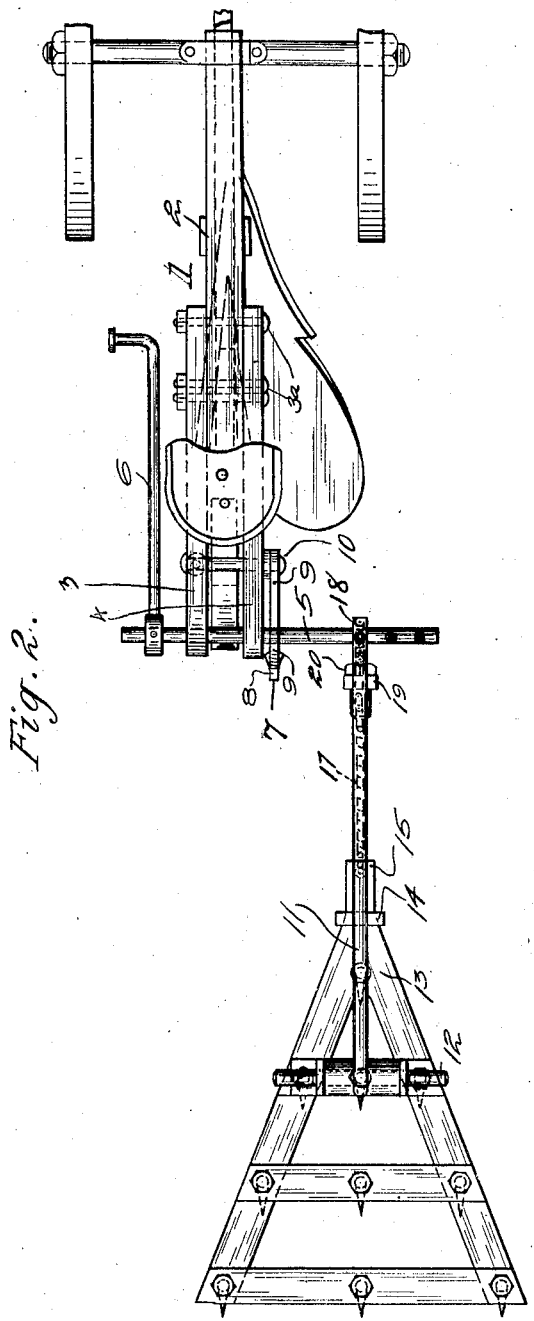

KRISTOFER ANDERSON, OF LARSON, NORTH DAKOTA.

HARROW ATTACHMENT FOR PLOWS.

1,333,056. Specification of Letters Patent. Patented Mar. 9, 1920.

Application filed January 2, 1919. Serial No. 269,294.

*To all whom it may concern:*

Be it known that I, KRISTOFER ANDERSON, a citizen of the United States, residing at Larson, in the county of Burke and State of North Dakota, have invented certain new and useful Improvements in Harrow Attachments for Plows, of which the following is a specification.

This invention relates to improvements in harrow attachments for plows. The chief object of the invention is to provide an attachment of this type by means of which the harrow may be lifted clear of the ground to cleanse the knives or teeth should they become clogged. A further object is to provide means for retaining the harrow in raised position when desired. A further object is to provide manually operable means whereby the front end of the harrow may be adjusted relatively to the plow. A further object is to provide a device of this type that it simple in construction, efficient in operation and cheap to manufacture. With the foregoing and other objects in view the invention consists in the combination and arrangement of parts to be hereinafter fully described, pointed out in the appended claims and illustrated in the accompanying drawings which form a part of this specification and in which—

Figure 1 is a view of my improved harrow attachment in side elevation illustrating its application, the dotted lines showing the harrow in raised position.

Fig. 2 is a top plan view of the device as applied to a plow.

Like reference characters denote corresponding parts in both views.

The reference numeral 1 denotes a sulky plow to the frame 2 of which I secure, by bolts 3ª, the rearwardly extending downwardly curved bars 3, 4 in the ends of which the rotary transverse shaft 5 is journaled, one end of said shaft 5 having made fast thereto one end of the foot lever 6. A curved lug 7 made fast to the shaft 5 adjacent the bar 4 is formed with a notch 8 adapted for engagement with the pronged end of the dog 9 that is secured by pivot 10 to the bar 4, said dog serving to releasably retain the lug 7 in raised position when desired. To the shaft 5 I secure one end of the reach bar 11 which is secured at its other end to the bar 12 which is made fast to the harrow frame 13. A pedestal 14 secured to the harrow frame 13 beneath the reach bar 11 and in advance of the bar 12 is adapted for engagement with the reach bar as the forward end of the harrow frame is raised in a manner to be hereinafter described.

To the very front end 15 of the harrow frame I secure a link 16 to which one end of a chain 17 is secured, the opposite end of said chain being secured to an adjusting screw 18 arranged in a bracket 19 formed integral with one end of the reach bar 11, said screw being provided with the nut 20. By rotation of the adjusting screw in one direction the chain 17 may be drawn taut and the front end of the harrow frame raised. Rotation of the screw in the opposite direction will obviously slack the chain 17 and lower the harrow end. Pressure upon the free end of the foot lever 6 will partially rotate the shaft 5 and cause the reach bar to raise the harrow frame partially or entirely off the ground as shown in dotted lines in Fig 1. As the reach bar is secured nearer the front end than the rear end of the harrow frame the front end of the frame will be raised first until the pedestal 14 engages with the reach bar and at that time the harrow frame will be raised as a unit. When the shaft 5 has been turned to a certain point the dog 9 can be placed in engagement with the notched portion 8 of the lug 7 to retain the shaft and harrow frame in adjusted position. Disengagement of the members 7 and 9 with pressure removed from the free end of the foot lever will cause the harrow frame to gravitate back to normal position.

What is claimed is:—

1. In a harrow attachment for plows, a rotary shaft operatively carried by the plow, a foot lever made fast to one end of said rotary shaft, a reach bar connecting the opposite end of said rotary shaft and the harrow frame, and a pedestal carried by the harrow frame beneath the reach bar and disposed in advance of the point of engagement of said reach bar with the harrow frame.

2. In a harrow attachment for plows, a rotary shaft operatively carried by the plow, a foot lever made fast to one end of said rotary shaft, a reach bar connecting the opposite end of said rotary shaft and the harrow frame, a pedestal carried by the harrow frame beneath the reach bar and disposed in advance of the point of engagement of said reach bar with the harrow frame, and means carried by the plow and said rotary shaft for releasably locking them together in a predetermined position.

3. In a harrow attachment for plows, a rotary shaft operatively carried by the plow, a foot lever made fast to one end of said rotary shaft, a reach bar connecting the opposite end of said rotary shaft and the harrow frame, a pedestal carried by the harrow frame beneath the reach bar and disposed in advance of the point of engagement of said reach bar with the harrow frame, a notched lug made fast to said rotary shaft, and a dog pivotally carried by the plow for releasable engagement with the said notched lug.

4. In a harrow attachment for plows, a rotary shaft operatively carried by the plow, a lever made fast to one end of said rotary shaft, a reach bar connecting the opposite end of said rotary shaft and the harrow frame, and means connecting the front end of said harrow frame and the said reach bar whereby limited adjustment of said harrow frame may be effected.

5. In a harrow attachment for plows, a rotary shaft operatively carried by the plow, a lever made fast to one end of said rotary shaft, a reach bar connecting the opposite end of said rotary shaft and the harrow frame, a bracket integral with one end of said reach bar and disposed beneath the same, an adjusting screw arranged in said bracket, a nut for said screw, and a chain connecting said adjusting screw and the forward end of the harrow frame.

In testimony that I claim the foregoing as my own I have hereto affixed my signature in the presence of two subscribing witnesses.

KRISTOFER ANDERSON.

Witnesses:
J. A. SODERQUIST,
NELS DUCKSTAD.